United States Patent [19]

Ishii et al.

[11] 4,098,875
[45] Jul. 4, 1978

[54] METHOD FOR THERMOCHEMICAL PRODUCTION OF HYDROGEN FROM WATER

[75] Inventors: Eiichi Ishii, Toyonaka; Hiroshi Ishikawa; Itsuki Uehara, both of Ikeda; Masanori Nakane, Takatsuki; Yoshizo Miyake, Toyonaka, all of Japan

[73] Assignee: Agency of Industrial Science & Technology, Tokyo, Japan

[21] Appl. No.: 775,561

[22] Filed: Mar. 8, 1977

[30] Foreign Application Priority Data

Mar. 16, 1976 [JP] Japan .................................. 51-28842

[51] Int. Cl.² ............................................. C01B 1/08
[52] U.S. Cl. .................................... 423/658; 423/493; 423/507; 423/579
[58] Field of Search ............... 423/658, 657, 648, 579, 423/481, 493, 632, 633, 507

[56] References Cited

U.S. PATENT DOCUMENTS

| 3,919,406 | 11/1975 | Grimes | 423/648 |
| 3,998,942 | 12/1976 | Pangborn et al. | 423/658 |
| 4,024,230 | 5/1977 | Knoche et al. | 423/658 X |

FOREIGN PATENT DOCUMENTS 2,322,702  11/1974  Fed. Rep. of Germany ....... 423/658

OTHER PUBLICATIONS

Funk, 9th Energy Conversion Engineering Conference, 1974 Proceedings, pp. 394–399.
Wentorf et al. "Science," vol. 185, No. 4148, Jul. 26, 1974, pp. 311–319.

*Primary Examiner*—Edward J. Meros
*Attorney, Agent, or Firm*—Oblon, Fisher, Spivak, McClelland & Maier

[57] ABSTRACT

A method for efficient production of hydrogen by thermochemical decomposition of water by use of tri-iron tetraoxide and hydrogen bromide as main cyclic reaction media.

10 Claims, 3 Drawing Figures

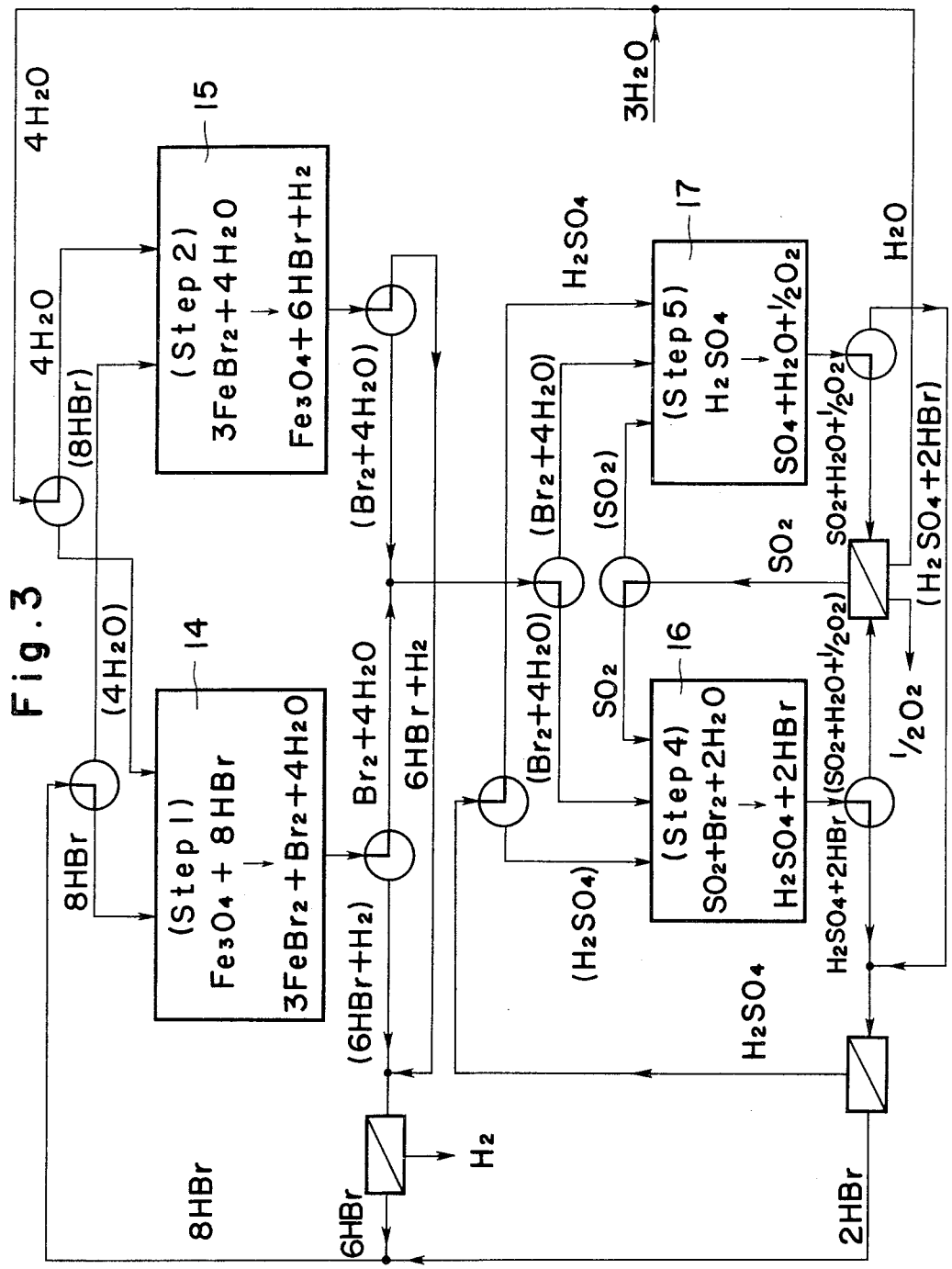

METHOD FOR THERMOCHEMICAL PRODUCTION OF HYDROGEN FROM WATER

BACKGROUND OF THE INVENTION

This invention relates to a method for the production of hydrogen by thermochemical decomposition of water. More particularly, the present invention relates to a method for the production of hydrogen by thermochemical decomposition of water by use of tri-iron tetraoxide and hydrogen bromide as the main cyclic reaction media.

Hydrogen is attracting ever increasing attention not only for its widespread utility in industrial applications but also for its potential as an energy source promising to replace fossil fuels as the secondary source of energy after the depletion of the latter. The development of so-called hydrogen energy systems has been enthusiastically pursued in recent years through research denoted to producing technology for the production, storage and utility of hydrogen.

Recently, there has been proposed a thermochemical method, i.e. a method for decomposing water into hydrogen and oxygen by effective use of a plurality of chemical reactions caused by the high-temperature thermal energy generating from high-temperature gas reactor, for example. Great attention is now being focused on this method, for it is expected to offer higher thermal efficiency than the water electrolysis. For the thermochemical production of hydrogen, a number of methods involving use of varying cyclic reaction media have already been proposed.

One of these methods has been proposed by the present inventors (U.S. Pat. No. 3,996,342): This method accomplishes the production of hydrogen by the thermochemical decomposition of water by use of barium iodide, carbon dioxide and ammonia as cyclic reaction media.

Recently, the iron-chlorine cycle in which iron and chlorine are used as cyclic reaction media is attracting keen attention.

Many reaction cycles have been proposed for the thermochemical production of hydrogen by the iron-chlorine cycle. Of the many cycles proposed, the following three are representative:

A cycle $$6FeCl_2 + 8H_2O \rightarrow 2Fe_3O_4 + 12HCl + 2H_2 \quad \text{(i)}$$

$$2Fe_3O_4 + \tfrac{1}{2} O_2 \rightarrow 3Fe_2O_3 \quad \text{(ii)}$$

$$3Fe_2O_3 + 18HCl \rightarrow 6FeCl_3 + 9H_2O \quad \text{(iii)}$$

$$6FeCl_3 \rightarrow 6FeCl_2 + 3Cl_2 \quad \text{(iv)}$$

$$3Cl_2 + 3H_2O \rightarrow 6HCl + 3/2\, O_2 \quad \text{(v)}$$

B cycle $$6FeCl_2 + 8H_2O \rightarrow 2Fe_3O_4 + 12HCl + 2H_2 \quad \text{(vi)}$$

$$2Fe_3O_4 + 3Cl_2 + 12HCl \rightarrow 6FeCl_3 + 6H_2O + O_2 \quad \text{(vii)}$$

$$6FeCl_3 \rightarrow 6FeCl_2 + 3Cl_2 \quad \text{(viii)}$$

C cycle $$6FeCl_2 + 8H_2O \rightarrow 2Fe_3O_4 + 12HCl + 2H_2 \quad \text{(ix)}$$

$$2Fe_3O_4 + 9Cl_2 \rightarrow 6FeCl_3 + 4 O_2 \quad \text{(x)}$$

$$6FeCl_3 \rightarrow 6FeCl_2 + 3Cl_2 \quad \text{(xi)}$$

$$12HCl + 3 O_2 \rightarrow 6H_2O + 6Cl_2 \quad \text{(xii)}$$

Of the elementary reactions which make up these reaction cycles, the reactions other than that of the steps (iv), (viii) and (xi) can be caused to proceed rather efficiently by selecting suitable reaction conditions. It has been heretofore considered, however, that the elementary reaction which is involved in each of the three reaction cycles, namely in said steps (iv), (viii) and (xi) for thermal decomposition of ferric chloride, cannot be easily caused to proceed with high efficiency.

Further, the elementary reactions of the steps (iii), (vii) and (x), namely the reactions for the chlorination of iron oxide, do not proceed smoothly and have the further disadvantage of requiring higher temperatures. Therefore, practical application of these reaction cycles will require the solution of numerous problems.

A primary object of this invention is to overcome the problems of the iron-chlorine cycle and provide a method for the production of hydrogen by the thermochemical decomposition of water, wherein all the elementary reactions proceed efficiently at temperatures invariably below 900° C and involve no complicated processes in the separation of reaction products.

Another object of the present invention is to provide a method which permits hydrogen to be produced continuously by the thermochemical decomposition of water.

SUMMARY OF THE INVENTION

To attain the objects described above according to the present invention, there is provided a method for the production of hydrogen which comprises allowing tri-iron tetraoxide and hydrogen bromide to react with each other and produce iron dibromide, bromine and water (step (a)), permitting the iron dibromide formed in step (a) to undergo hydrolysis and produce tri-iron tetraoxide, hydrogen bromide and hydrogen, separating the three products from one another, circulating the tri-iron tetraoxide to step (a), recovering the hydrogen as the product, converting the bromine into hydrogen bromide by using sulfur dioxide, zinc oxide, indium oxide or calcium oxide as the cycle reaction medium and returning the hydrogen bromide to step (a).

These elementary reactions invariably proceed smoothly at temperatures below 900° C and the reaction products do not require frequent separation and can, if such should be required, be easily separated from one another. Since the reaction products are wholly circulated through the reaction system, production of hydrogen can easily be carried out on a commercial basis by continuing the feeding of water to the reaction system.

No operation is required for moving any solid-phase compounds. And the step of the reversible conversion of tri-iron tetraoxide $\rightleftarrows$ iron bromide and the step of the conversion of bromine $\rightarrow$ hydrogen bromide can be carried out each in one reaction vessel. The whole equipment, therefore, is simple. By operating a plurality of reaction systems in combination, the production of hydrogen can be continuously obtained.

The other objects and characteristic features of the present invention will become apparent from the description to be given in detail hereinafter with reference to the accompanying drawings.

BRIEF DESCRIPTION OF THE DRAWINGS

FIG. 3 is a flow sheet illustrating yet another preferred embodiment of the method for production of hydrogen according to this invention.

DESCRIPTION OF THE PREFERRED EMBODIMENTS

Figure 1:
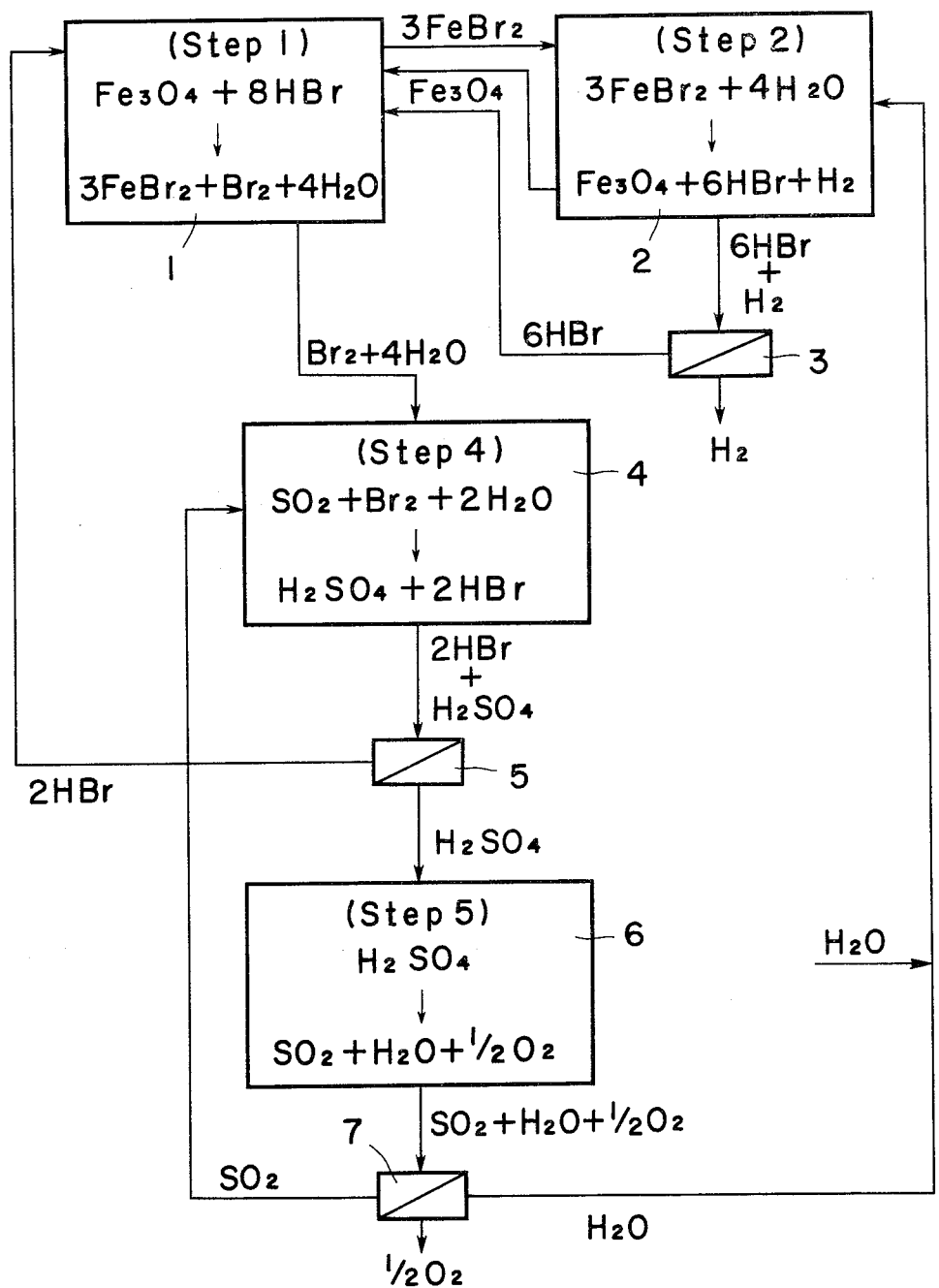
FIG. 1 is a flow sheet illustrating one preferred embodiment of the method for production of hydrogen according to this invention.

The inventors continued various studies with a view to eliminating the problems encountered in the operation of the cycle using iron and chlorine as cyclic reaction media and improving the operational efficiency of the cycle as a whole. They have consequently made a discovery that said problems are completely solved and the operational efficiency of the cycle is improved to a notable extent by using the combination of iron and bromine instead of iron and chlorine as the main cycle reaction media. This discovery has led to the accomplishment of this invention.

The chemistry which underlies the method of this invention for the production of hydrogen resides in the combination of the three chemical reactions expressed by the following formulas:

$$Fe_3O_4 + 8HBr \rightarrow 3FeBr_2 + Br_2 + 4H_2O \quad (1)$$

$$3FeBr_2 + 4H_2O \rightarrow Fe_3O_4 + H_2 + 6HBr \quad (2)$$

$$Br_2 + H_2O \rightarrow 2HBr + \tfrac{1}{2} O_2 \quad (3)$$

The numerals found in step (Nos.) to be indicated hereinafter in the specification correspond to those given above in the parenthesis to identify the respective chemical reactions.

In the process for the production of hydrogen by the present invention, the reaction of tri-iron tetraoxide with hydrogen bromide gas in step (1) is a solid-gas reaction which proceeds at a high reaction velocity. Even at room temperature, tri-iron tetraoxide and hydrogen bromide gas react and produce iron dibromide, bromine and water at a high reaction velocity as soon as they are brought into contact with each other. At 350° K, iron bromides occur in the relationship of $\Delta G_{FeBr_2} < \Delta G_{FeBr_3}$. At temperatures above 80° C, $FeBr_2$ is stabler than $FeBr_3$. When the reaction is carried out at temperatures in the range of from 200° to 300° C, therefore, the reaction velocity is high and the product is solely of iron dibromide in an anhydrous form. This reaction proves effective because it has no need for anything like the thermal decomposition treatment of iron trichloride which is indispensible to the iron-chlorine cycle. The hydrogen bromide gas used in this reaction may be of the type that contains water. The bromine which is formed in step (1) is in a gaseous form and is withdrawn from the reaction system in a state mixed with steam. The gaseous bromine and steam in said mixed state when left to stand at room temperature, separate from each other and form two layers. For supply to step (3), the bromine need not be separated from water but may be forwarded thereto while still in said mixed state.

In step (2), the iron dibromide formed in step (1) is allowed to react with water. This reaction begins at nearly 450° C. It proceeds with generation of hydrogen and simultaneous formation of a film of tri-iron tetraoxide on the surface of iron dibromide. On the other hand, sublimation of iron dibromide begins at nearly 550° C. It is, therefore, advantageous to control the reaction temperature around 650° C. The reaction of step (2) yields a mixed gas of hydrogen and hydrogen bromide plus tri-iron tetraoxide. The latter reaction product remains in the reaction system. The mixed gas can easily be separated into the component compounds by use of an anticorrosive separation membrane. Otherwise, hydrogen can easily be separated from the mixed gas by bubbling the mixed gas through a water, because hydrogen bromide dissolves into water and consequently converts into hydrobromic acid. The hydrogen thus isolated from the mixed gas is recovered as the product. The tri-iron tetraoxide and the hydrogen bromide (or hydrobromic acid) are circulated to step (1).

The hydrolysis of bromine in step (3) is intended to convert the bromine formed in step (1) into hydrogen bromide, which is circulated to step (1).

In the direct reaction of bromine with water, the conversion obtainable is about 10%, or about 15% at most even in the presence of a catalyst, based on the amount of bromine supplied. One possible way of improving the efficiency of this reaction is to separate and recover hydrogen bromide or oxygen as it is formed during the reaction, thereby shifting the equilibrium. This approach is complicated and cannot be expected to provide any appreciable improvement in the conversion. For this reason, the inventors studied from various angles the reaction of step (3) directed to conversion of bromine into hydrogen bromide. They have consequently acquired a knowledge that the desired conversion of bromine into hydrogen bromide can easily be accomplished by using sulfur dioxide, zinc oxide, indium oxide or calcium oxide as a reaction medium.

The reaction effected to convert bromine into hydrogen bromide by use of said reaction medium proceeds as expressed by the following chemical formulas.

Sulfur dioxide $$SO_2 + Br_2 + 2H_2O \rightarrow H_2SO_4 + 2HBr \quad (4)$$

$$H_2SO_4 \rightarrow H_2O + SO_2 + \tfrac{1}{2} O_2 \quad (5)$$

Zinc oxide $$ZnO + Br_2 \rightarrow ZnBr_2 + \tfrac{1}{2} O_2 \quad (6)$$

$$ZnBr_2 + H_2O \rightarrow ZnO + 2HBr \quad (7)$$

Indium oxide $$1/3In_2O_3 + Br_2 \rightarrow 2/3InBr_3 + \tfrac{1}{2} O_2 \quad (8)$$

$$2/3InBr_3 + H_2O \rightarrow 1/3In_2O_3 + 2HBr \quad (9)$$

Calcium oxide $$CaO + Br_2 \rightarrow CaBr_2 + \tfrac{1}{2} O_2 \quad (10)$$

$$CaBr_2 + H_2O \rightarrow CaO + 2HBr \quad (11)$$

First, the case in which sulfur dioxide is used as the reaction medium will be described.

The reaction of step (4) involving bromine, sulfur dioxide and water can be carried out in a gaseous phase but it will proceed more readily in a liquid phase at temperatures of from 20° to 30° C. For this reason, the bromine formed in step (1) is circulated in a state not separated from water to step (4). Since this reaction is caused by combined use of an oxidizing agent and a reducing agent, it proceeds very rapidly and substantially quantitatively. It is exothermic reaction. This reaction yields sulfuric acid and hydrogen bromide, which are easily separated from each other by distillation. The sulfuric acid is forwarded to step (5) which will be described later and the hydrogen bromide is circulated to step (1).

The sulfuric acid which is formed in step (4) undergoes a reaction of thermal decomposition in step (5). This reaction proceeds advantageously at temperatures above 650° C, particularly at nearly 800° C. and very seldom entails a reversed reaction. As the product of the thermal decomposition mentioned above, there is obtained a mixed gas of sulfur dioxide and oxygen. Since the presence of oxygen in the sulfur dioxide to be used in step (4) has no adverse effect upon the reaction involved, the mixed gas may be circulated in its unaltered form to step (4). Otherwise, oxygen may be isolated from the mixed gas by any known method and recovered as a by-product, with the remaining sulfur dioxide to be circulated to step (4).

Now, the case in which zinc oxide is used as the reaction medium will be described.

In the reaction of step (6) for bromination of zinc oxide, the bromine which has been separated from the mixture of bromine and steam formed in step (1) is used. Although this reaction begins to proceed around 650° C, it is advantageous to have the reaction carried out at temperatures in the range of from 800° to 900° C. In this case, the zinc bromide which is produced in conjunction with oxygen sublimes and deposits fast at low-temperature portions of the reaction vessel. Since bromine as a reactant is generally used in an excess amount, there arises necessity to separate oxygen and bromine from each other after the reaction. Since bromine is liquid at room temperature, this separation is accomplished far more easily than in the case of the chlorine cycle. This conspicuous ease of separation constitutes itself one of the advantages of the bromine cycle. The hydrolysis of zinc bromide in step (4) is a gas-gas reaction and proceeds advantageously at temperatures above 700° C, particularly at nearly 900° C. Of the products of the hydrolysis, the zinc oxide is forwarded to step (6) and the hydrogen bromide is circulated to step (1).

The case in which indium oxide is used as a reaction medium to facilitate conversion of bromine into hydrogen bromide will be described.

For the bromination of indium oxide in step (8), the bromine separated from the mixture of bromine and water formed in step (1) is used. Although this bromination begins to proceed around 650° C, it is advantageously carried out at temperatures of from 800° to 900° C. In this case, the indium bromide which is formed in conjunction with oxygen sublimes and deposits fast at low-temperature portions of the reaction vessel. Thus, it can readily be separated from oxygen. The oxygen thus obtained is recovered as a by-product.

Subsequently, the indium bromide formed in step (8) is subjected to hydrolysis in step (9). This hydrolysis is a gas-gas reaction which proceeds at temperatures in the range of from 700° to 900° C and rather rarely entails a reversed reaction. The conversion is 30 to 35% at 700° C and 55 to 60% at 900° C. Of the products of the hydrolysis, the indium oxide is forwarded to step (8) and the hydrogen bromide is circulated to step (1).

Further, the case in which calcium oxide is used as a reaction medium to facilitate the conversion of bromine into hydrogen bromide will be described.

For the bromination of calcium oxide in step (10), there is used the bromine which has been separated from the mixture of bromine and water formed in step (1). This bromination is carried out advantageously at temperatures above 300° C, particularly in the range of from 500° to 700° C. As the result of this reaction, oxygen produce and calcium bromide remains. The oxygen thus produced is recovered as a by-product.

The calcium bromide which is formed in step (10) is subjected to hydrolysis in step (11). This hydrolysis is a gas-solid reaction which proceeds at temperatures in the range of from 700° to 900° C. The conversion of this reaction is 40 to 50% at 700° C, 50 to 60% at 800° C and 60 to 65% at 900° C. This reaction yields calcium oxide and hydrogen bromide. The calcium oxide is solid and the hydrogen bromide is gas. They are, therefore, separated easily from each other. The calcium oxide is circulated to step (10) and the hydrogen bromide to step (1).

For better understanding of the method for production of hydrogen according to the present invention, one preferred embodiment of this invention will be described with reference to the accompanying drawings.

With reference to FIG. 1, tri-iron tetraoxide and hydrogen bromide are allowed to react in the first reaction vessel 1. Of the products of this reaction, iron dibromide is forwarded to the second reaction vessel 2 and bromine and water are forwarded to the third reaction vessel 4. In the second reaction vessel 2, the iron dibromide is hydrolyzed. The tri-iron tetraoxide consequently formed is returned to the first reaction vessel 1. The mixed gas of hydrogen bromide and hydrogen which produced in the second reaction vessel 2 is separated into the component gases in the first separator of a suitable known operating principle. The hydrogen resulting from the separation is recovered as a final product and the remaining hydrogen bromide is returned to the first reaction vessel 1. In the third reaction vessel 4, sulfur dioxide is allowed to react with the mixture of bromine and water forwarded from the first reaction vessel 1. The mixture of sulfuric acid and hydrogen bromide resulting from the reaction is separated into the component compounds by a separator 5 operated by the distillation process. The hydrogen bromide is returned to the first reaction vessel 1 and the sulfuric acid is forwarded to the fourth reaction vessel 6. In the fourth reaction vessel 6, the sulfuric acid is thermally decomposed to give rise to a mixed gas of sulfur dioxide, steam and oxygen. This mixed gas is separated into the component gases in the separator 7. The sulfur dioxide is returned to the third reaction vessel 4, the oxygen is recovered as a by-product and the water is supplied, if necessary in conjunction with freshly added water, to the second reaction vessel 2.

Figure 2:
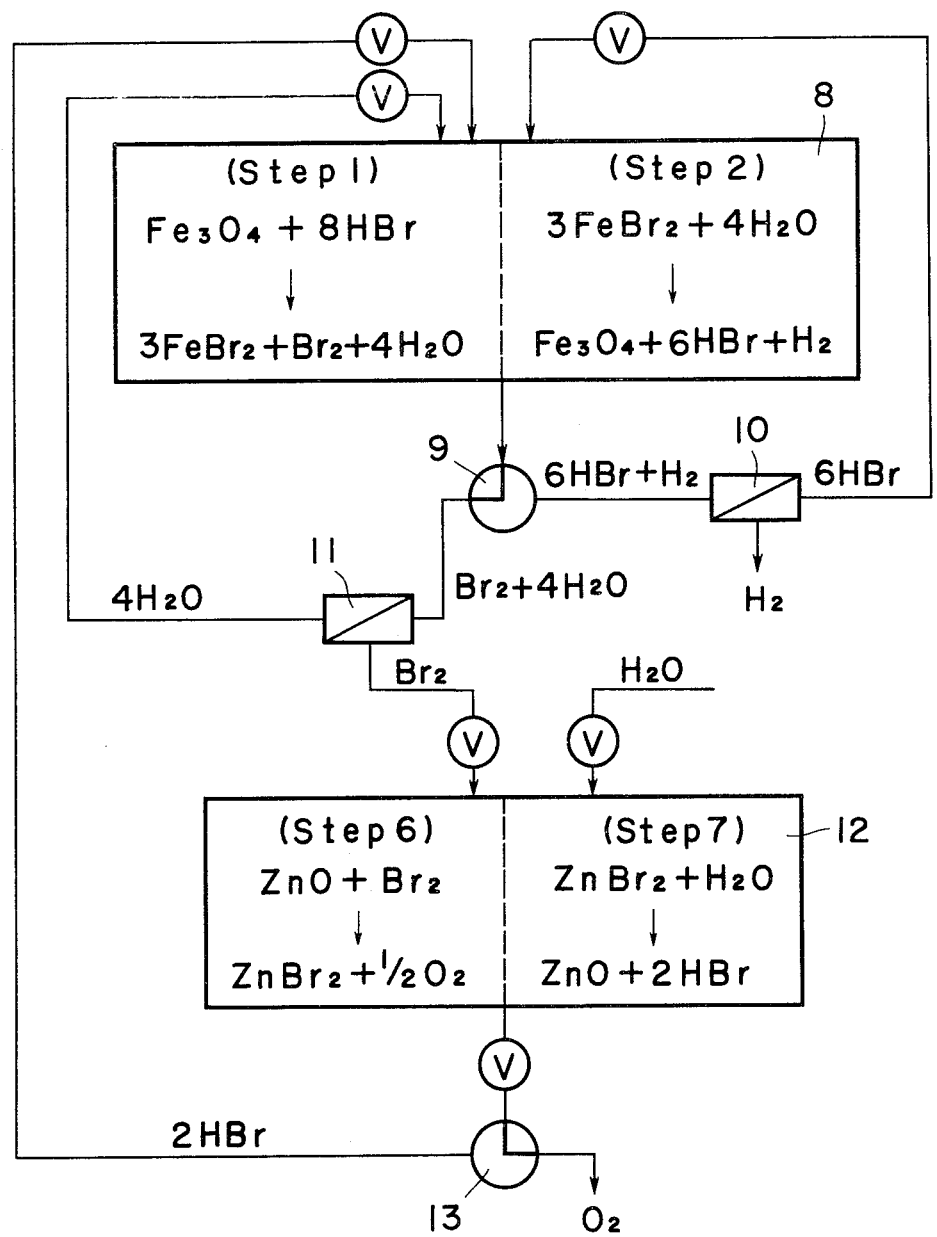
FIG. 2 is a flow sheet illustrating another preferred embodiment of the method for production of hydrogen according to this invention.

FIG. 2 is a flow chart illustrating another preferred embodiment of the present invention for the production of hydrogen.

The reaction of step (1) between tri-iron tetraoxide and hydrogen bromide is carried out in the first reaction vessel 8. The mixed gas of bromine and steam which is formed in the reaction is forwarded through a selector valve 9 to the separator 11, wherein it is separated into the component gases. The water resulting from the separator is put to storage in a suitable tank (not shown). The bromine separated from the mixed gas is forwarded to the second reaction vessel 12 and allowed to react with zinc oxide. The oxygen which produced in the second reaction vessel 12 is recovered as a by-product via the selector valve 13. When the reaction of step (1) is terminated in the first reaction vessel 8, iron dibromide remains in the reaction vessel. Then, water is supplied via an open valve to the first reaction vessel 8 and the reaction temperature is elevated to the range of 550° to 650° C. Consequently, the reaction of step (2) begins to proceed in the first reaction vessel. The mixed gas of hydrogen bromide and hydrogen which is formed by the reaction is forwarded through the selector valve 9 to the separator 10, in which it is separated into hydrogen and hydrogen bromide. The hydrogen thus separated is recovered as a final product. The hydrogen bromide is stored by suitable means. While the reaction of step (2) is proceed in the first reaction vessel 8, water is supplied to the second reaction vessel 12 and allowed to react with the remaining zinc bromide to give rise to hydrogen bromide and zinc oxide. The hydrogen bromide is forwarded through the selector valve 13 and put to suitable means in preparation for the reaction of step (1) in the first reaction vessel 8.

Although the method for the production of hydrogen according to the present invention comprises four chemical reactions, these reactions can in fact be carried out in two reaction vessels. The method can be effectively performed by causing only gaseous and liquid compounds to be circulated without having to move solid compounds such as iron and zinc. In the case of the preferred embodiment illustrated in FIG. 2, the method has been described as involving use of zinc oxide. This method can be similarly carried out by using indium oxide or calcium oxide.

The flow sheet of FIG. 3 represents a case in which two sets of the reaction system shown in FIG. 1 are arranged and provided with complete piping as illustrated, so that the reaction of step (1) is carried out in the first reaction vessel 14, that of step (2) in the second reaction vessel 15, that of step (4) in the third reaction vessel 16 and that of step (5) in the fourth reaction vessel 17 at temperatures suited to their respective purposes. In the overall operation thus conducted, the reaction products are circulated as indicated in the drawing. Reaction products formed in excess amounts are put to storage by suitable means. At the time that the reactions proceeding in all the reaction vessels are terminated, the switch valves are simultaneously turned so that the reaction vessels, when emptied, will be charged with the compounds respectively indicated in the parentheses and then adjusted to suitable reaction temperatures. As a result, the reaction of step (2) begins to proceed in the first reaction vessel 14, that of step (1) in the second reaction vessel 15, that of step (5) in the third reaction vessel 16 and that of step (4) in the fourth reaction vessel 17. The cyclic reaction media are properly circulated to and from the reaction vessels and only the water which is consumed in the reaction has to be replenished from time to time. In this manner, hydrogen is formed and recovered substantially continuously.

In the commercial production of hydrogen by the thermochemical decomposition of water, the reaction system in use is desired to be of the type capable of generating hydrogen in as large a volume as possible. What is far more important is the fact that there should be established a reaction cycle which does not entail a heavy energy consumption, uses as the reaction media such elements or compounds as will exhibit neither toxicity nor corrosiveness, permits easy separation and recovery of formed reaction products and ensures perfect circulation of such reaction products.

From the foregoing point of view, the method of the present invention is found to be such that all the reactions involved invariably proceed efficiently at temperatures not exceeding the level of 900° C. Thus, the reactions can be effectively performed by using the thermal energy recovered such as from a high-temperature gas reactor or by using solar heat. Further, the elementary reactions all excel in reaction velocity and degree of completion and entail virtually no side reactions. Noteworthy is the fact that separation of reaction products is required in only a few steps and no complicated separation whatsoever is involved in any of the reactions and that all the reaction products can be cyclically used within the reaction system. Moreover, while the method of the present invention is actually made up of four elementary reactions, all these reactions can be carried out in two reaction vessels, without necessitating any movement of solid-phase compounds. This means that the method of this invention permits hydrogen and oxygen to be easily produced from water.

Examples of the present invention will be cited herein below, which are solely illustrative of and not limitative in any sense of the present invention.

EXAMPLE 1

Step (1) - In an anticorrosive reaction vessel, 100 g of tri-iron tetraoxide was heated to temperatures of around 250° C. Then, the gas (mixed gas of HBr and $H_2O$) produced by boiling a concentrated aqueous solution of hydrobromic acid delivered at a flow rate of 15 ml/min. was fed into the reaction vessel for about 30 minutes. Immediately the reaction of tri-iron tetraoxide with hydrogen bromide gas began to proceed at a high reaction velocity. The bromine and water which were by-produced in the form of a mixed gas go out from the reaction system, remaining 274 g of iron dibromide behind in the reaction vessel. This amount practically equals to the theoretical value. The mixture of bromine and water which exhausted from the reaction system was separated into the two layers. The amount of bromine thus obtained was 68 g.

Step (2) - In an anticorrosive reaction vessel, 274 g of the iron dibromide obtained in step (1) was heated to temperatures of about 600° C, and steam was fed to the reaction vessel at a rate of 1 g of $H_2O$/min. to hydrolyze. From the surface inwardly, the iron dibromide was converted into tri-iron tetraoxide. The iron dibromide in the inner portion, because of its mild subliming property at this temperature, moved little by little to the surface and underwent reaction. Eventually, the iron dibromide was converted in its entire amount into tri-iron tetraoxide. The gases produced by this reaction were hydrogen, hydrogen bromide and a mixed gas of hydrogen bromide and steam. Separation of the hydrogen was effected by bybbling the gas mixture through a water. The concentrated aqueous solution of hydrobromic acid was returned to step (1). In the course of this reaction hydrogen was obtained at a rate of about 40 ml/min.

Step (4) - A glass reaction vessel provided with a reflux condenser was charged with 68 g of bromine and 68 g of water. Into this vessel was delivered, at a rate of 200 ml/min., the sulfur dioxide produced by the thermal decomposition in step (5) which will be described later. The reaction which ensued was exothermic. Under the conditions mentioned above, the temperature of the solution rose up to 70° C. By the time that the total volume of sulfur dioxide fed thereto reached about 9.3 l, the hydrobromic acid became a saturated state. At this point, hydrogen bromide gas began to generate. The color of bromine disappeared when the total amount of sulfur dioxide rose to 9.7 l. This amount substantially equals to the theoretical value.

The mixed acid solution of hydrobromic acid and sulfuric acid obtained from the reaction was transferred into a distillation device and subjected to distillation. In the first period of the distillation, large volumes of hydrogen bromide gas generated. In the subsequent period, azeotropic hydrobromic acid (47.6% HBr) was distilled. About 96% of the formed hydrogen bromide was distilled out in the form of hydrogen bromide gas plus azeotropic hydrobromic acid. The remaining 4% was distilled out in the form of hydrobromic acid of 5 to 30% concentration.

The amount of the residue of distillation was 41 g. By analysis, this residue was identified to be concentrated sulfuric acid containing absolutely no bromide. This sulfuric acid was circulated to step (5).

Step (5) - The concentrated sulfuric acid, 41 g, obtained in step (4) was delivered at a rate of 0.7 g of $H_2SO_4$/min. to a preheater to be vaporized therein. Then, the vaporized sulfuric acid was led into and decomposed thermally in a heat-resistant, anticorrosive reaction tube packed with about 50 cm$^3$ of a transition metal oxide as the catalyst and kept under a current of argon gas fed at 250 ml/min. Rate of the thermal decomposition in this reaction was 70% and 90% at 800° and 900° C, respectively.

The gas resulting from the thermal decomposition was separated from the unaltered portion of sulfuric anhydride and returned to step (4).

EXAMPLE 2

Step (1) - In an anticorrosive reaction vessel, 100 g of tri-iron tetraoxide was heated at about 250° C. Then, the gas (mixed gas of HBr and $H_2O$) generated by boiling a concentrated aqueous solution of hydrobromic acid was fed at a flow rate of 15 ml/min. into the reaction vessel for 30 minutes. The reaction of tri-iron tetraoxide with hydrogen bromide gas immediately began to proceed at a high reaction velocity. After the by-produced bromine and water departed from the reaction system, 274 g of iron dibromide was remained in the reaction vessel. The amount substantially equals to the theoretical value.

Step (2) - The iron dibromide obtained in the amount of 274 g in step (1) was placed in a heat-resistant, anticorrosive reaction vessel and heated to a temperature of about 600° C. Into the reaction vessel, steam was fed at a flow rate of 1 g $H_2O$/min. to hydrolyze the contents. The iron dibromide underwent the reaction successively from the steam inlet side inwardly and converted into pure tri-iron tetraoxide. The gas produced by the reaction was a mixed gas of hydrogen and hydrogen bromide. The hydrogen occurred at a rate of 40 ml $H_2$/min.

The mixed gas of hydrogen and hydrogen bromide thus produced was separated into the component gases by bubbling the gas mixture through a water. The concentrated hydrobromic acid solution and 98 g tri-iron tetraoxide remaining in the reaction vessel were returned to step (1).

Step (6) - In a heat-resistant, anticorrosive reaction vessel, 25 g of zinc oxide was heated to a temperature of about 750° C. Then, the bromine obtained in step (1) was fed to the reaction vessel at a flow rate of about 3 g $Br_2$/min. to induce a reaction. The zinc bromide which formed with the progress of the reaction sublimed. The reaction velocity did not decline because the layer of zinc oxide was always exposed on the surface. The zinc bromide thus produced by the reaction deposited at low-temperature portions of the reaction vessel and the mixture consisting of the unaltered bromine and the by-produced oxygen underwent gas-liquid separation. About 3.5 l of oxygen resulting from said separation was recovered as a by-product and the bromine was circulated to the reaction vessel.

The aforementioned amount of zinc oxide was caused to react with an excess amount of bromine to produce 67 g of zinc bromide (96% in yield), which was circulated to step (7).

Step (7) - In a heat-resistant, anticorrosive reaction vessel, the zinc bromide, 67 g, obtained in step (6) was gradually vaporized. The vaporized zinc bromide was hydrolyzed with steam at the reaction section kept at about 750° C. The zinc oxide which formed from said hydrolysis settled to the bottom of the reaction vessel, while the hydrogen bromide gas and the excess steam spurted from the upper section of the vessel. Since the unreacted zinc bromide was recirculated to participate in the subsequent reaction, 43 g of hydrogen bromide gas (89% in yield) was obtained.

The zinc oxide produced in this step was forwarded to step (6) and the hydrogen bromide was circulated to step (1).

EXAMPLE 3

Step (1) - By faithfully following the procedure of step (1) of Example 2, tri-iron tetraoxide and hydrogen bromide were reacted with each other to afford bromine and iron dibromide.

Step (2) - Under entirely the same conditions as those of step (2) of Example 2, the iron dibromide obtained in step (1) was hydrolyzed to afford tri-iron tetraoxide and a mixed gas of hydrogen bromide and hydrogen. The tri-iron tetraoxide was returned to step (1) and the mixed gas was separated into hydrogen and hydrogen bromide by using an anticorrosive separation membrane. The hydrogen was recovered as the final product and the hydrogen bromide was returned to step (1).

Step (8) - In a heat-resistant, anticorrosive reaction vessel, 30 g of indium oxide was heated to a temperature of about 800° C. Then, the bromine obtained in step (1) was fed to the reaction vessel at a flow rate of about 3 g $Br_2$/min. to induce a reaction. The indium bromide which formed with the progress of the reaction sublimed. The reaction velocity remained constant because the layer of indium oxide was always exposed on the surface. The indium bromide produced by the reaction deposited at low-temperature portions of the reaction vessel. The mixture consisting of the unaltered bromine and the by-produced oxygen underwent gas-liquid separation. The oxygen resulting from said separation was recovered as a by-product and the bromine was circulated to the reaction vessel.

The aforementioned amount of indium oxide and the excess amount of bromine were caused to react with each other to afford 74 g of indium bromide (97% in yield), which was circulated to step (9).

Step (9) - In a heat-resistant, anticorrosive reaction vessel, the indium bromide, 74 g, obtained in step (8) was gradually vaporized. The vaporized indium bromide was hydrolyzed with steam at the reaction section kept at about 750° C. The indium oxide produced by said hydrolysis settled to the bottom of the reaction vessel, while the hydrogen bromide gas spurted in conjunction with the excess steam through the upper portion of the reaction vessel. Since the unreacted indium bromide was recirculated to participate in the subsequent reaction, 47 g of hydrogen bromide gas (93% in yield) was obtained.

The indium oxide produced in the reaction was forwarded to step (8) and the hydrogen bromide was returned to step (1).

EXAMPLE 4

Step (1) - Under entirely the same conditions as those of step (1) of Example 2, tri-iron tetraoxide and hydrogen bromide were caused to react with each other to afford bromine and iron dibromide.

Step (2) - Under entirely the same conditions as those of step (2) of Example 2, the iron dibromide obtained in step (1) above was hydrolyzed to afford tri-iron tetraoxide and a mixed gas of hydrogen bromide and hydrogen. The tri-iron tetraoxide was returned to step (1) and the mixed gas was separated into hydrogen and hydrogen bromide by using an anticorrosive separation membrane. The hydrogen was recovered as the final product and the hydrogen bromide was returned to step (1).

Step (10) - In a heat-resistant, anticorrosive reaction vessel, 20 g of calcium oxide was heated to a temperature of about 500° C. Then the bromine obtained in step (1) was fed to the reaction vessel at a flow rate of about 3 g Br$_2$/min. to induce a reaction. As the reaction proceeded, calcium bromide formed on the surface of calcium oxide. The entire reactants were occasionally agitated whenever the velocity of reaction showed a sign of slight decline.

The aforementioned amount of calcium oxide and the excess amount of bromine were caused to react with each other to produce 68 g of calcium bromide (96% in yield), which was circulated to step (11).

Step (11) - In a heat-resistant, anticorrosive reaction vessel, 68 g of the calcium bromide obtained in step (10) was heated to a temperature of about 700° C. Steam was fed into the reaction vessel at a flow rate of 1 g H$_2$O/min. to hydrolyze the contents. Since the unreacted calcium bromide was further caused to react with the excess amount of steam, 51 g of hydrogen bromide gas (93% in yield) was obtained.

The calcium oxide produced by the reaction of this step was forwarded to step (10) and the hydrogen bromide was returned to step (1).

What is claimed is:

1. A method for the production of hydrogen by the thermochemical decomposition of water, which comprises the steps of
   (a) preparing iron dibromide, bromine and water by reacting tri-iron tetraoxide with hydrogen bromide,
   (b) hydrolyzing the iron dibromide obtained in step (a), thereby producing tri-iron tetraoxide and a mixture of hydrogen bromide and hydrogen,
   (c) separating the mixture to hydrogen bromide and hydrogen, the hydrogen thus obtained being recovered as the product,
   (d) reacting the bromide obtained in step (a) to regenerate hydrogen bromide, and
   (e) cycling the tri-iron tetraoxide obtained in step (b) and the hydrogen bromides obtained in steps (c) and (d) to step (a).

2. The method according to claim 1, wherein the step (a) is carried out at a temperature between 200° and 300° C.

3. The method according to claim 1, wherein the step (b) is carried out at a temperature between 550° and 650° C.

4. The method according to claim 1, wherein the bromine obtained in step (a) is reacted with sulfur dioxide and water to thereby produce hydrogen bromide and sulfuric acid, the hydrogen bromide obtained is recycled to step (a), the sulfuric acid obtained is subjected to thermal decomposition to thereby produce sulfur dioxide, water and oxygen, and the sulfur dioxide obtained is recycled to the step of bromine-sulfur dioxide-water reaction.

5. The method according to claim 4, wherein the bromine is reacted with sulfur dioxide and water at a temperature between 20° and 80° C.

6. The method according to claim 4, wherein the sulfuric acid is subjected to thermal decomposition at a temperature between 650° and 850° C.

7. The method according to claim 1, wherein the bromine obtained in step (a) is reacted with one oxide selected from the group consisting of zinc oxide, indium oxide and calcium oxide to thereby produce bromide and oxygen, the bromide is hydrolyzed to thereby produce said one oxide and hydrogen bromide, the said one oxide obtained is recycled to the step of bromine-oxide reaction and the hydrogen bromide obtained is recycled to step (a).

8. The method according to claim 7, wherein the bromine is reacted with zinc oxide at a temperature between 750° and 900° C to thereby produce zinc bromide and oxygen, the zinc bromide obtained is hydrolyzed at a temperature between 700° and 900° C to thereby produce zinc oxide and hydrogen bromide, the zinc oxide obtained is recycled to the step of bromine-zinc oxide reaction and the hydrogen bromide obtained is recycled to step (a).

9. The method according to claim 7, wherein the bromine is reacted with indium oxide at a temperature between 800° and 900° C to thereby produce indium bromide and oxygen, the indium bromide obtained is hydrolyzed at a temperature between 700° and 900° C to thereby produce indium oxide and hydrogen bromide, the indium oxide obtained is recycled to the step of bromine-indium oxide reaction and the hydrogen bromide obtained is recycled to step (a).

10. The method according to claim 7, wherein the bromine is reacted with calcium oxide at a temperature between 500° and 700° C to thereby producing calcium bromide and oxygen, the calcium bromide obtained is hydrolyzed at a temperature between 700° and 900° C to thereby produce calcium oxide and hydrogen bromide, the calcium oxide obtained is recycled to the step of bromine-calcium oxide reaction and the hydrogen bromide is recycled to step (a).

* * * * *